United States Patent [19]

Raketich

[11] Patent Number: 4,767,109
[45] Date of Patent: Aug. 30, 1988

[54] POSITIONING APPARATUS

[76] Inventor: Milton F. Raketich, 421 Saratoga Ave., Kingsford, Mich. 49801

[21] Appl. No.: 30,884

[22] Filed: Mar. 26, 1987

[51] Int. Cl.[4] .............................................. B23Q 1/04
[52] U.S. Cl. ........................................ 269/61; 269/71
[58] Field of Search .................. 269/61, 71; 254/3 R, 254/3 B, 3 C, 10 R, 10 B, 10 C; 414/742, 743, 917, 590

[56] References Cited

U.S. PATENT DOCUMENTS

| | | | |
|---|---|---|---|
| 2,396,161 | 3/1946 | Cullen | 269/61 |
| 2,469,644 | 5/1949 | Harrison | 269/61 |
| 2,786,434 | 3/1957 | Klungtvedt | 269/71 |
| 2,787,826 | 4/1957 | Aronson | 269/71 |
| 2,835,964 | 5/1958 | Yurwood | 269/71 |
| 2,899,197 | 8/1959 | Hilkemeier | 269/61 |
| 4,479,632 | 10/1984 | McIntire et al. | 414/743 |
| 4,548,544 | 10/1985 | Appledorn | 414/917 |

Primary Examiner—Robert C. Watson
Attorney, Agent, or Firm—Michael, Best & Friedrich

[57] ABSTRACT

An apparatus for positioning a load or workpiece, the apparatus comprising a support table including a generally planar surface for supporting the workpiece, a first hydraulic motor for moving the table vertically, a second hydraulic motor for rotating the table about a rotational axis generally perpendicular to the surface, a third hydraulic motor for pivoting the table about a pivot axis generally perpendicular to the rotational axis, and a hydraulic pump for supplying fluid to the first, second and third hydraulic motors.

22 Claims, 3 Drawing Sheets

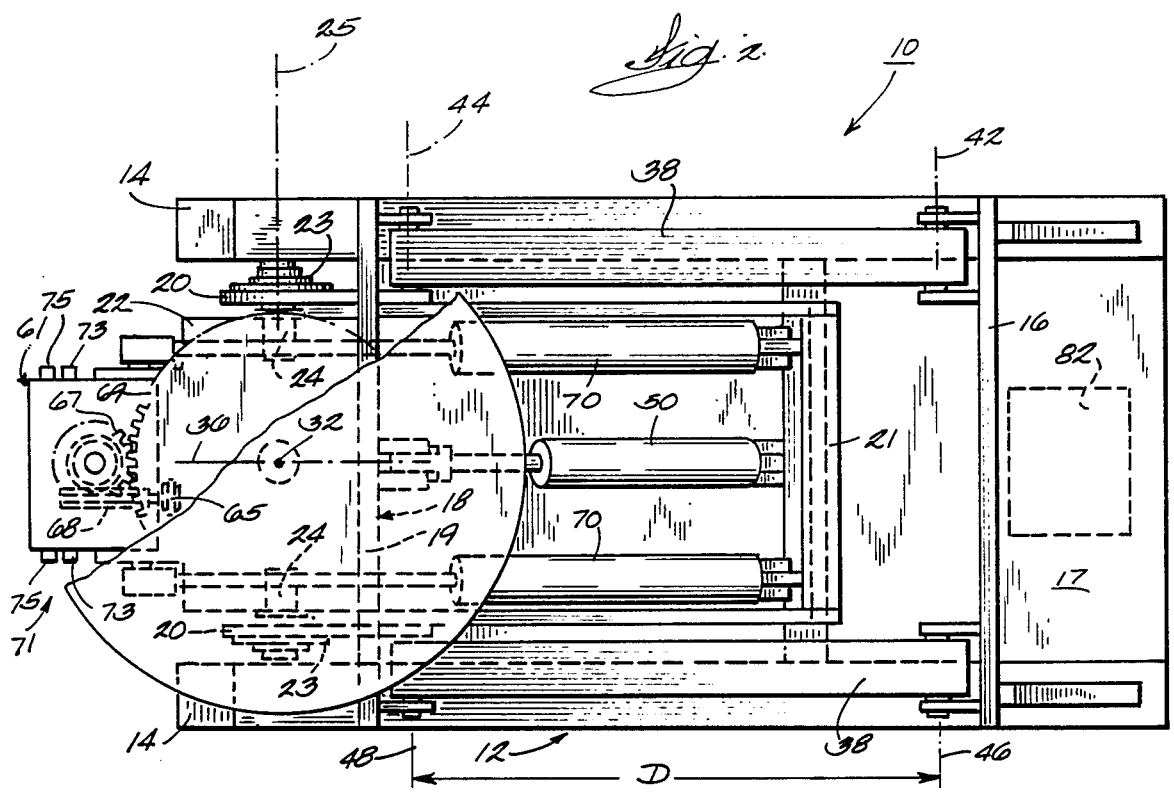
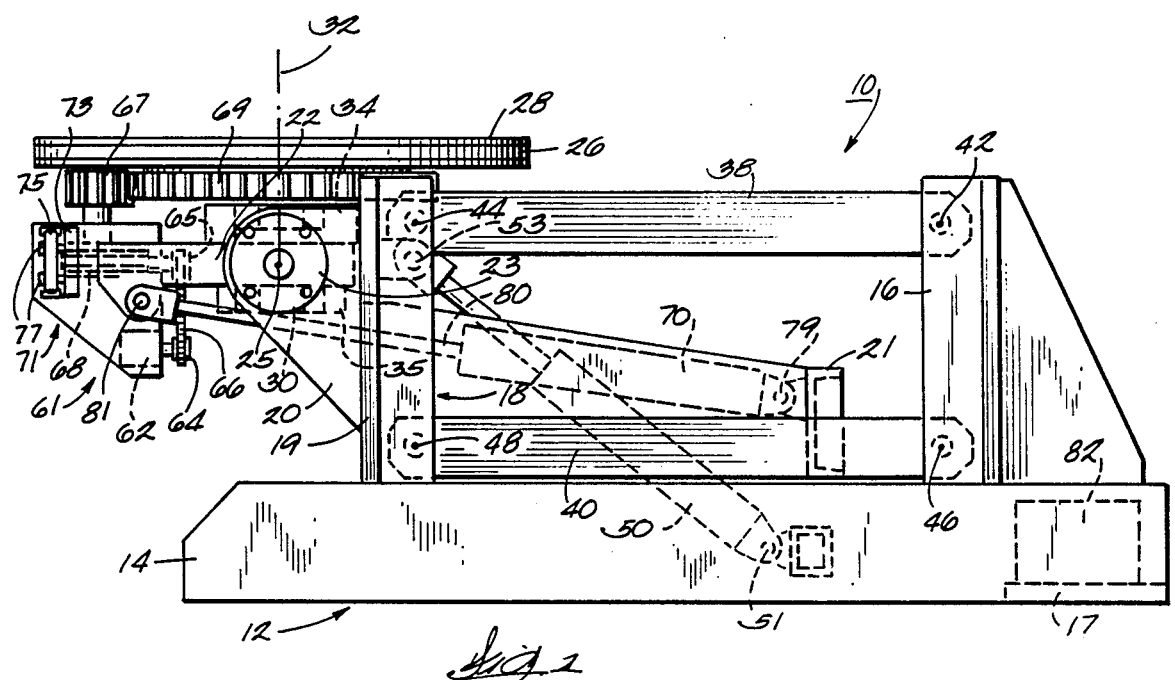

POSITIONING APPARATUS

BACKGROUND OF THE INVENTION

The invention relates to apparatus for positioning a load or workpiece, and more particularly to apparatus for positioning a workpiece that is to be welded.

Known apparatus of this type include a table having a generally planar surface for supporting the load or workpiece, and the table is mounted for pivotal movement about a first axis extending generally perpendicular to the supporting surface, and about a second axis extending generally perpendicular to the first axis. These apparatus also include a rack and pinion arrangement for moving the table vertically. Three electric motors provide the three different types of movement, i.e., pivotal movement about the first and second axes and vertical movement. Such apparatus are sold by Aronson Machine Company, Arcade, N.Y.

SUMMARY OF THE INVENTION

The invention provides an apparatus for positioning a load or workpiece, the apparatus comprising a head frame, and a support table mounted on the head frame and including a generally planar surface for supporting the load or workpiece. The support table is mounted on the head frame for pivotal movement relative thereto about a rotational axis extending generally perpendicular to the supporting surface and in a generally vertical plane, and for pivotal movement relative thereto about a generally horizontal pivot axis extending generally perpendicular to the vertical plane.

The apparatus also comprises a main frame adapted to rest on a supporting surface, and four generally parallel, elongated members having equal lengths and connecting the head frame to the main frame. The four elongated members include a pair of upper members each having a first end mounted on the main frame for pivotal movement relative thereto about a first generally horizontal axis, and a second end connected to the head frame for pivotal movement relative thereto about a second generally horizontal axis parallel to the first axis. The four elongated members also include a pair of lower members each having a first end mounted on the main frame for pivotal movement relative thereto about a third generally horizontal axis parallel to and below the first axis, and a second end connected to the head frame for pivotal movement relative thereto about a fourth generally horizontal axis parallel to the third axis.

The elongated members are movable between a lower position wherein the members extend generally horizontally and the support table is in a lower position, and an upper position wherein the upper and lower members extend upwardly from the main frame and the support table is in an upper position above the lower position.

The apparatus further comprises a rotary hydraulic motor and gear arrangement for causing pivotal movement of the table about the first axis, a pair of hydraulic cylinder and piston assemblies connected between the head frame and the table for causing pivotal movement of the table about the second axis, and a hydraulic cylinder and piston assembly connected between the main frame and the head frame for causing vertical movement of the head frame and of the support table.

In the preferred embodiment, the apparatus further comprises a single hydraulic pump for supplying hydraulic fluid to the rotary hydraulic motor and to the three hydraulic cylinder and piston assemblies. Preferably, the pump is mounted on the main frame and is connected to the rotary hydraulic motor and to the hydraulic cylinder and piston assemblies by flexible conduits.

A principal feature of the invention is the provision of the four parallel, elongated members connecting the head frame to the main frame. This permits the apparatus to be collapsed into a much smaller volume than prior apparatus and to have a simpler and less expensive construction. At the same time, the apparatus equals or exceeds prior apparatus in its ability to support heavy loads.

Another principal feature of the invention is the provision of hydraulic means for causing the three types of movement of the support table, and a single hydraulic pump for supplying fluid to the three hydraulic means. As a result, the apparatus requires only one motor, rather than three. Also, the hydraulic means decrease the need for reduction gearing and provide greater lifting forces.

Other features and advantages of the invention will become apparent to those skilled in the art upon review of the following detailed description, claims and drawings.

DESCRIPTION OF THE DRAWINGS

FIG. 1 is a side elevational view of an apparatus embodying the invention.

FIG. 2 is a top view of the apparatus.

Figure 3:
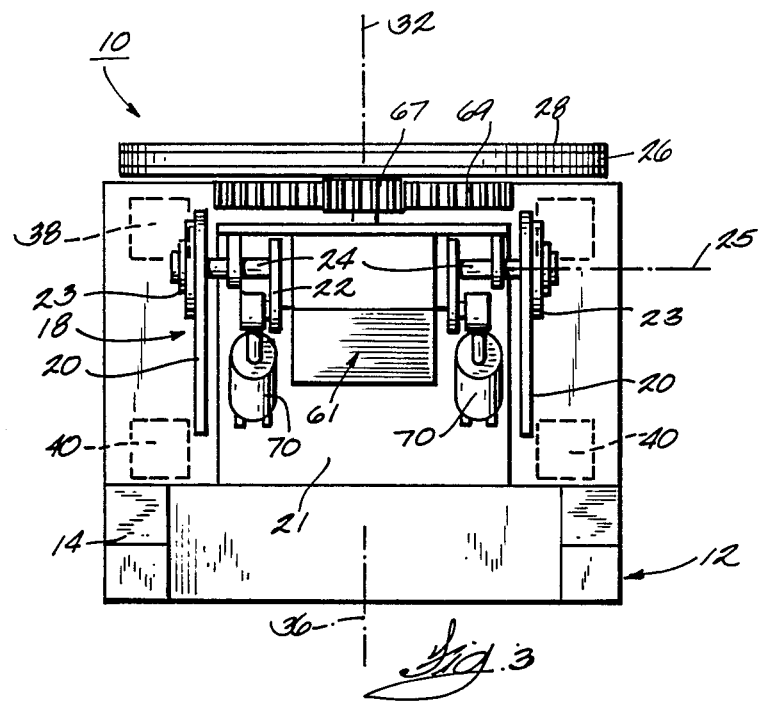
FIG. 3 is an elevational view of the right end of the apparatus as shown in FIG. 1.
Figure 4:
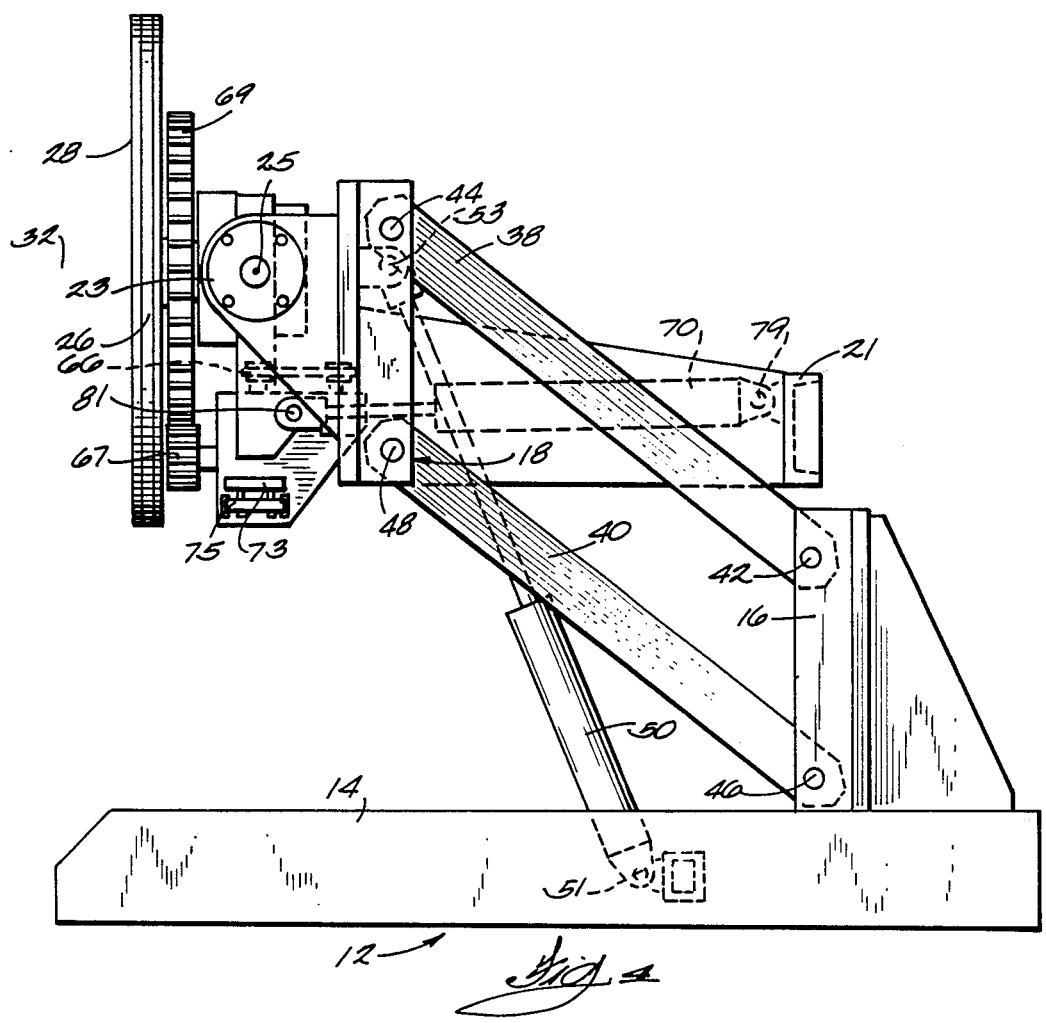
FIG. 4 is a side elevational view of the apparatus with the supporting table in the upper position and rotated 90° relative to FIG. 1.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A positioning apparatus 10 embodying the invention is illustrated in the drawings. As shown in FIGS. 1–4, the apparatus 10 comprises a main frame 12 adapted to rest on a supporting surface. The main frame 12 includes a pair of generally parallel, elongated members 14 which rest on the supporting surface, an upright member 16 mounted on the elongated members 14, and a plate 17 mounted between the members 14 behind the upright member 16.

The apparatus 10 also comprises a head frame 18. The head frame 18 includes a vertically movable head member 19, a pair of support flanges 20 extending forwardly (to the left in FIG. 1) from the head member 19, and a cylinder support frame 21 extending rearwardly from the head member 19. The flanges 20 support bearings 23, and the apparatus 10 also comprises a support block or member 22 mounted via trunnions 24 housed in the bearings 23 for pivotal movement relative to the head frame 18 about a generally horizontal pivot axis 25.

The apparatus 10 further comprises a support table 26 mounted on the support block 22 and including a generally planar surface 28 for supporting a load or workpiece. More particularly, the support table 26 is mounted on the end of a shaft 30 which is centered on a rotational axis 32 and which is supported on the support block 22 by upper and lower bearings respectively supported by upper and lower bearing bosses 34 and 35. The support table 26 is therefore mounted on the support block 22 for pivotal movement relative thereto about the rotational axis 32. In the preferred embodiment, the rotational axis 32 extends generally perpendicular to the supporting surface 28 and in a generally vertical plane 36 which extends generally perpendicular to the pivot axis 24. The support table 26 can be rotated 360° relative to the support block 22, and the support block 22 can be rotated 135° relative to the head frame 18. This permits any surface of a workpiece mounted on the support table 26 to be oriented horizontally. A horizontal orientation is necessary for certain welding operations.

The apparatus 10 further comprises means for supporting the head frame 18 and table 26 for generally vertical movement. This means includes four generally parallel, elongated, upper and lower members 38 and 40 connecting the head frame 18 to the upright member 16 of the main frame 12. Preferably, the members 38 and 40 have substantially equal lengths. The upper members 38 each have right and left ends (as viewed in FIG. 1). The right end of each of the upper members 38 is mounted on the upright member 16 of the main frame 12 for pivotal movement relative thereto about a first generally horizontal axis 42, and the left end of each of the upper members 38 is connected to the head member 19 for pivotal movement relative thereto about a second generally horizontal axis 44 parallel to the first axis 42 and spaced a predetermined distance "D" therefrom. In the preferred embodiment, the predetermined distance "D" is approximately equal to the lengths of the members 38 and 40. The lower members 40 extend generally parallel to the upper members 38 and each has right and left ends. The right end of each of the lower members 40 is mounted on the upright member 16 of the main frame 12 for pivotal movement relative thereto about a third generally horizontal axis 46 parallel to and below the first axis 42, and the left end of each of the lower members 40 is connected to the head member 19 for pivotal movement relative thereto about a fourth generally horizontal axis 48 parallel to the third axis 46 and spaced the predetermined distance "D" therefrom.

The four members 38 and 40 are movable between a first or lower position (shown in FIG. 1) wherein the members 38 and 40 extend generally horizontally so that the head frame 18 and support table 26 are in a lower position, and a second or upper position (shown in FIG. 4) wherein the four members 38 and 40 extend upwardly from the main frame 12 so that the head frame 18 and support table 26 are in an upper position above the lower position.

Figure 5:
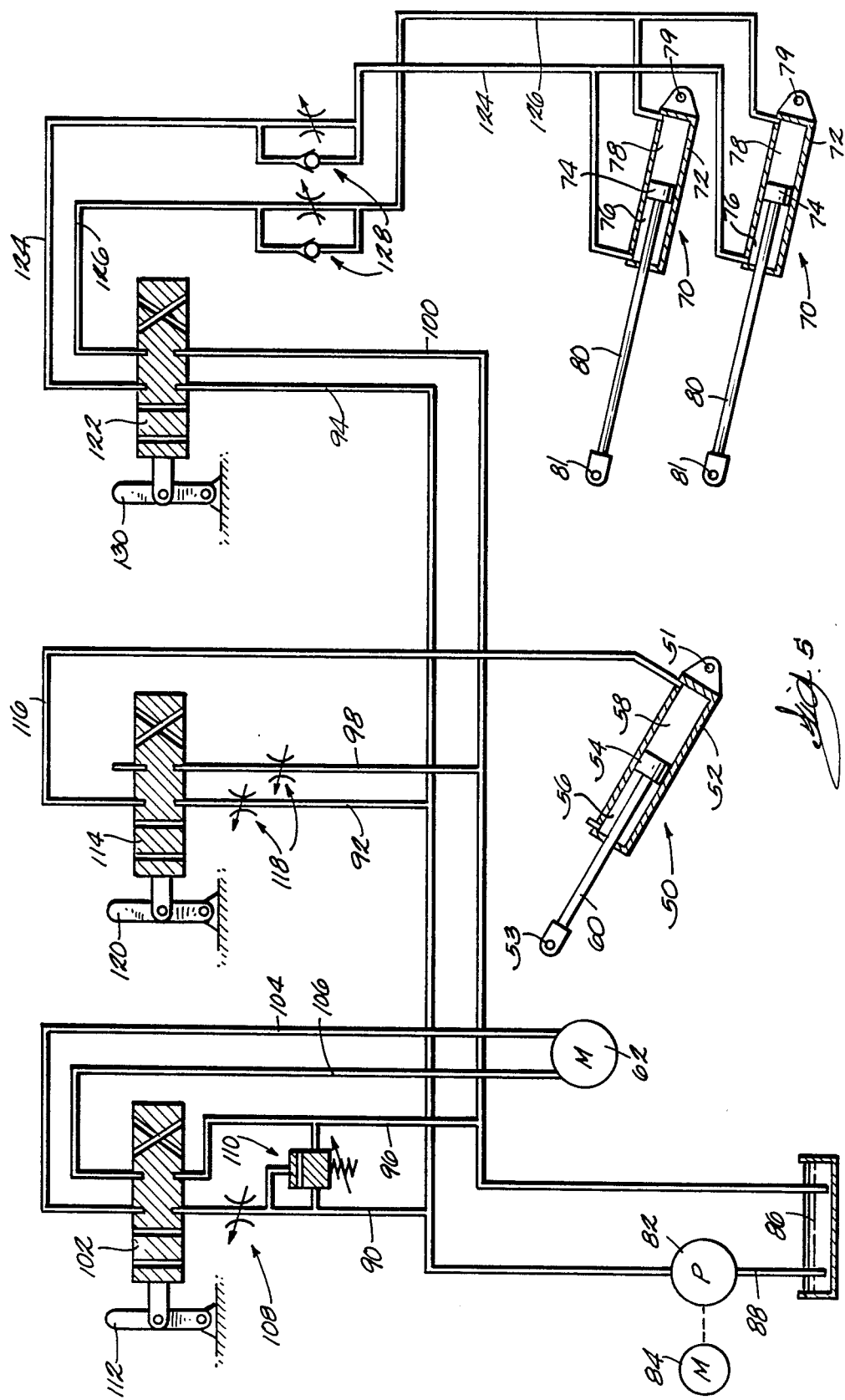
FIG. 5 is a schematic view of the hydraulic system of the apparatus.

The means for supporting the head frame 18 and table 26 for vertical movement also includes means for causing pivotal movement of the elongated members 38 and 40 about their respective axes. While various suitable means, such as conventional electric motors, can be employed, such means preferably includes a hydraulic cylinder and piston assembly 50 having a lower end pivotally connected at 51 to the main frame 12 and an upper end pivotally connected at 53 to the head member 19. As best shown in FIG. 5, the assembly 50 includes a cylinder 52 pivotally connected to the main frame 12, a piston 54 dividing the cylinder into upper and lower chambers 56 and 58, respectively, and a piston rod 60 having one end pivotally connected to the head member 19 and another end fixedly connected to the piston 54. In the preferred embodiment, the upper chamber 56 of the cylinder 52 is vented to the atmosphere. When hydraulic fluid is supplied to the lower chamber 58, the assembly 50 extends and causes clockwise (as shown in FIG. 1) pivotal movement of the members 38 and 40 relative to the main frame 12. When hydraulic fluid is allowed to flow out of the lower chamber 58, the force of gravity acting on the apparatus 10 causes the assembly 50 to contract.

The apparatus 10 further comprises means for rotating the table 26 about the rotational axis 32. While various suitable means can be used, in the preferred embodiment, this means includes a drive assembly 61 mounted on the support block 22. As best shown in FIGS. 1 and 2, the drive assembly 61 includes a rotary hydraulic motor 62 drivingly connected to a sprocket 64. The sprocket 64 is drivingly connected to a sprocket 65 via a chain 66, and the sprocket 65 is drivingly connected to a drive gear 67 via a worm gear reducer 68. The drive gear 67 drivingly engages a bull gear 69 which is fixedly mounted on the underside of the table 26. The worm gear reducer 68 is self-locking and prevents the table 26 from rotating unless driven by the hydraulic motor 62.

Adjustment means 71 is provided for locking and adjusting the position of the drive gear 67 relative to the bull gear 69. The adjustment means 71 includes a pair of members 73 fixedly mounted on opposite sides of the drive assembly 61, and a pair of members 75 adjustably connected to respective members 73 via bolts 77. The position of the members 75 is adjusted by turning the bolts 77. The members 75 are also connected to the drive gear 67 for adjusting the position of the drive gear 67 in response to adjustment of the position of the members 75.

The apparatus 10 further comprises means for pivoting the support block or member 22 and the table 26 about the pivot axis 25. While various suitable means can be employed, in the preferred embodiment, this means includes a pair of parallel hydraulic cylinder and piston assemblies 70 each having a right end pivotally connected at 79 to the head member 19, and a left end pivotally connected at 81 to the support block 22. As best shown in FIG. 5, each of the assemblies 70 includes a cylinder 72 having an end pivotally connected to the head member 19, a piston 74 dividing the cylinder 72 into left and right chambers 76 and 78, respectively, and a piston rod 80 having one end pivotally connected to the support block 22 and a second end fixedly connected to the piston 74. When hydraulic fluid is supplied to the right chambers 78, the assemblies 70 extend and cause clockwise movement of the support block 22 and table 26. When hydraulic fluid is supplied to the left chambers 76, the assemblies 70 contract and cause counterclockwise movement of the support block 22 and table 26.

The apparatus 10 further comprises a single hydraulic pump 82 (shown schematically in FIG. 5 and in dotted lines in FIG. 1) for supplying hydraulic fluid to the hydraulic motor 62 and to the hydraulic cylinder and piston assemblies 50 and 70. As shown in FIG. 1, the pump 82 has a lower end mounted on the plate 17 of the main frame 12. The pump 82 is driven by an electric motor 84 and is connected to the hydraulic motor 62 and to the hydraulic cylinder and piston assemblies 50 and 70 by flexible conduits (shown schematically in FIG. 5).

As shown in FIG. 5, the hydraulic system of the apparatus includes a reservoir 86, and a supply conduit 88 communicating between the reservoir 86 and the inlet of the pump 82. The hydraulic system also includes supply conduits 90, 92 and 94 connected in parallel to the outlet of the pump 82, and return conduits 96, 98 and 100 connected in parallel to the reservoir 86.

The system also includes a three-position valve 102 communicating with the supply conduit 90 and with the return conduit 96, and conduits 104 and 106 communicating between the valve 102 and the rotary hydraulic motor 62. The supply conduit 90 has therein a flow control valve 108, and a relief valve 110 is provided between the supply conduit 90 and the return conduit 96. When the valve 102 is in the center position, as shown in FIG. 5, it prevents communication of the supply and return conduits 90 and 96 with the conduits 104 and 106. When the valve 102 is in the right position (not shown), the supply conduit 90 communicates with the conduit 104 and the return conduit 96 communicates with the conduit 106. This causes rotary movement of the hydraulic motor 62 in one direction. When the valve 102 is in the left position (not shown), the supply conduit 90 communicates with the conduit 106 and the return conduit 96 communicates with the conduit 104. This causes rotary movement of the hydraulic motor 62 in the opposite direction. The valve 102 can be moved between its various positions by any suitable means, such as a manually operable lever 112.

The hydraulic system also includes a second three-position valve 114 communicating with the supply and return conduits 92 and 98, and a conduit 116 communicating between the valve 114 and the lower chamber 58 of the cylinder 52. Each of the supply and return conduits 92 and 98 has therein a flow restrictor valve 118. When the valve 114 is in the center position, as shown in FIG. 5, neither of the supply conduit 92 and the return conduit 98 communicates with the conduit 116. When the valve is in the right position (not shown), the supply conduit 92 communicates with the conduit 116. This causes extension of the hydraulic assembly 50. When the valve 114 is in the left position (not shown), the return conduit 98 communicates with the conduit 116. This permits contraction of the hydraulic assembly 50. The valve 114 can be moved between its various positions by any suitable means, such as a lever 120.

The hydraulic system also includes a three-position valve 122 communicating with the supply and return conduits 94 and 100, and conduits 124 and 126 communicating with the valve 122. The conduit 124 communicates with the left chambers 76 of the cylinders 72, and the conduit 126 communicates with the right chambers 78 of the cylinders 72. Each of the conduits 124 and 126 has therein a flow restriction valve arrangement 128. When the valve 22 is in the center position, as shown in FIG. 5, the supply and return conduits 94 and 100 do not communicate with the conduits 124 and 126. When the valve is in the right position (not shown), the supply conduit 94 communicates with the conduit 124 and the return conduit 100 communicates with the conduit 126. This causes contraction of the hydraulic assemblies 70. When the valve 122 is in the left position (not shown), the supply conduit 94 communicates with the conduit 126 and the return conduit 100 communicates with the conduit 124. This causes extension of the hydraulic assemblies 70. The valve 122 can be moved between its various positions by any suitable means, such as a lever 130.

The apparatus is used as follows: First, the operator secures the workpiece to the supporting surface 28 of the table 26. This can be done by any suitable means. Next, the operator moves the workpiece to the desired position. This is done by actuating the lever 112 to rotate the table 26 about the rotational axis 32, by actuating the lever 120 to move the table 26 vertically, and by actuating the lever 130 to pivot the table 26 about the pivot axis 25. More particularly, when the lever 112 is moved to the right as shown in FIG. 5, the table 26 rotates in one direction about the rotational axis 32. When the lever 112 is moved to the left, the table 26 rotates in the opposite direction about the rotational axis 32. When the lever 120 is moved to the right as shown in FIG. 5, the table 26 moves upwardly. When the lever 120 is moved to the left, the table 26 moves downwardly. When the lever 130 is moved to the right as shown in FIG. 5, the table 26 pivots counterclockwise about the pivot axis 25. When the lever 130 is moved to the left, the table 26 pivots clockwise about the pivot axis 25. Accordingly, by selectively actuating the levers 112, 120 and 130, the operator can position the workpiece such that any surface on the workpiece is oriented horizontally.

Various features of the invention are set forth in the following claims.

I claim:

1. An apparatus for positioning a load or workpiece, said apparatus comprising
   a head frame,
   a support table mounted on said head frame and including a surface for supporting the load,
   means for supporting said head frame for generally vertical movement, said means for supporting said head frame including a first elongated member having a first longitudinal axis, said first member having one end mounted for pivotal movement about a generally horizontal first axis and an opposite end pivotally connected to said head frame for pivotal movement relative thereto about a second axis generally parallel to said first axis and spaced a fixed distance in the direction of said first longitudinal axis from said first axis, and a second elongated member having a second longitudinal axis, said second member extending generally parallel to said first elongated member, and said second elongated member having one end mounted for pivotal movement about a third axis generally parallel to said first axis and spaced from said first axis, and an opposite end pivotally connected to said head frame for pivotal movement relative thereto about a fourth axis generally parallel to said first axis and spaced said fixed distance in the direction of said second longitudinal axis from said third axis,
   means for causing pivotal movement of said first member about said first axis,
   means for selectively rotating said table relative to said head frame about a rotational axis generally perpendicular to said surface, and means for selectively pivoting said table relative to said head frame about a pivot axis generally perpendicular to said rotational axis.

2. An apparatus as set forth in claim 1 wherein said means for causing pivotal movement of said first member includes hydraulic means.

3. An apparatus as set forth in claim 1 wherein said first and third axes are vertically spaced.

4. An apparatus as set forth in claim 1 wherein said rotational axis extends in a generally vertical plane and generally perpendicular to said first axis.

5. An apparatus as set forth in claim 1 wherein said pivot axis extends generally parallel to said first axis.

6. An apparatus as set forth in claim 5 wherein said means for causing pivotal movement to said first member includes first hydraulic means, wherein said means for rotating said table about said rotational axis includes second hydraulic means, wherein said means for rotating said table about said pivot axis includes third hydraulic means, and wherein said apparatus further comprises a hydraulic pump for supplying hydraulic fluid to said first, second and third hydraulic means.

7. An apparatus as set forth in claim 6 and further comprising a frame, wherein said first and second members are pivotally mounted on said frame for pivotal movement about said first and third axes, respectively, and wherein said hydraulic pump has a lower end mounted on said frame.

8. An apparatus for positioning a load or workpiece, said apparatus comprising
a frame,
a support table including a surface for supporting the load,
means for supporting said table for generally vertical movement, said means including a first elongated member having a first longitudinal axis, said first member being mounted on said frame for pivotal movement about a generally horizontal first axis and being connected to said table for pivotal movement relative thereto about a second axis generally parallel to said first axis and spaced a distance in the direction of said first longitudinal axis from said first axis, and a second elongated member having a second longitudinal axis, said second member extending generally parallel to said first elongated member, being mounted on said frame for pivotal movement about a third axis generally parallel to said first axis and spaced from said first axis, and being connected to said table for pivotal movement relative thereto about a fourth axis generally parallel to said first axis and spaced said distance in the direction of said second longitudinal axis from said third axis,
first hydraulic means for causing pivotal movement of said first member about said first axis,
second hydraulic means for selectively rotating said table relative to said first and second members about a rotational axis generally perpendicular to said surface,
third hydraulic means for selectively pivoting said table relative to said first and second members about a pivot axis generally perpendicular to said rotational axis, and
a hydraulic pump for supplying fluid to said first, second and third hydraulic means, said pump being mounted on said frame.

9. An apparatus as set forth in claim 8 wherein said first and third axes are vertically spaced.

10. An apparatus as set forth in claim 8 wherein said rotational axis extends in a generally vertical plane and generally perpendicular to said first axis.

11. An apparatus as set forth in claim 8 wherein said pivot axis extends generally parallel to said first axis.

12. An apparatus as set forth in claim 8 wherein said pivot axis extends generally horizontally.

13. An apparatus as set forth in claim 8 wherein said frame includes a pair of generally parallel, elongated members adapted to rest on a supporting surface, and a generally horizontal plate extending between said elongated members, and wherein said pump is mounted on said plate between said elongated members.

14. An apparatus as set forth in claim 13 wherein said frame further includes an upright member mounted on said elongated members, wherein said first member is mounted on said upright member for pivotal movement about said first axis, and wherein said second member is mounted on said upright member for pivotal movement about said third axis.

15. An apparatus as set forth in claim 7 wherein said frame includes a pair of generally parallel, elongated members adapted to rest on a supporting surface, and a generally horizontal plate extending between said elongated members, and wherein said pump is mounted on said plate between said elongated members.

16. An apparatus as set forth in claim 15 wherein said frame further includes an upright member mounted on said elongated members, wherein said first member is mounted on said upright member for pivotal movement about said first axis, and wherein said second member is mounted on said upright member for pivotal movement about said third axis.

17. An apparatus as set forth in claim 16 wherein said frame includes a pair of generally parallel, elongated members adapted to rest on a supporting surface, and a generally horizontal plate extending between said elongated members, and wherein said pump is mounted on said plate between said elongated members.

18. An apparatus as set forth in claim 17 wherein said frame further includes an upright member mounted on said elongated members, wherein said first member is mounted on said upright member for pivotal movement about said first axis, and wherein said second member is mounted on said upright member for pivotal movement about said third axis.

19. An apparatus for positioning a load or workpiece, said apparatus comprising
a main frame,
a head frame,
a support table including a surface for supporting the load, said support table being mounted on said head frame for pivotal movement relative thereto about a rotational axis extending generally perpendicular to said surface and in a generally vertical plane, and said support table being mounted on said head frame for pivotal movement relative thereto about a generally horizontal pivot axis extending generally perpendicular to said rotational axis,
means for selectively rotating said table relative to said head frame about said rotational axis,
means for selectively pivoting said table relative to said head frame about said pivot axis,
a pair of generally parallel, elongated upper members each having a first end and an opposite second end, said first end of each of said upper members being mounted on said main frame for pivotal movement relative thereto about a first generally horizontal axis, and said second end of each of said upper members being connected to said head frame for pivotal movement relative thereto about a second generally horizontal axis parallel to said first axis and spaced a fixed distance therefrom, a pair of generally parallel, elongated lower members extending generally parallel to said upper members and each having a first end and an opposite second end, said first end of each of said lower members being mounted on said main frame for pivotal movement relative thereto about a third generally horizontal axis parallel to and below said first horizontal axis, and said second end of each of said lower members being connected to said head frame for pivotal movement relative thereto about a fourth generally horizontal axis parallel to said third axis and spaced said fixed distance therefrom, and means for causing pivotal movement of said upper members about said first axis and of said lower members about said third axis, such that said upper and lower members are movable between a first position wherein said upper and lower members extend generally horizontally and said support table is in a lower position, and a second position wherein said upper and lower members extend upwardly from said frame and said support table is in an upper position above said lower position.

20. An apparatus as set forth in claim 19 wherein said means for causing pivotal movement of said upper and lower members includes hydraulic means.

21. An apparatus as set forth in claim 19 wherein said means for causing pivotal movement of said upper and lower members includes first hydraulic means, and wherein said apparatus further comprises second hydraulic means for rotating said support table about said rotational axis, and third hydraulic means for pivoting said support table about said pivot axis, and a hydraulic pump for supplying fluid to said first, second and third hydraulic means.

22. An apparatus as set forth in claim 21 wherein said pump has a lower end mounted on said main frame.

* * * * *